US010997015B2

(12) United States Patent
Singh et al.

(10) Patent No.: US 10,997,015 B2
(45) Date of Patent: May 4, 2021

(54) SELF-LEARNING DISASTER-AVOIDANCE AND RECOVERY

(71) Applicant: INTERNATIONAL BUSINESS MACHINES CORPORATION, Armonk, NY (US)

(72) Inventors: Naina Singh, Cary, NC (US); Daniela K. M. Trevisan, Porto Alegre (BR); Joseph Reyes, Pelham, NY (US); Mark A. Lindsay, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/288,257

(22) Filed: Feb. 28, 2019

(65) Prior Publication Data
US 2020/0278901 A1  Sep. 3, 2020

(51) Int. Cl.
*G06F 11/07* (2006.01)
*G06N 20/00* (2019.01)
*G06N 5/04* (2006.01)

(52) U.S. Cl.
CPC ........ *G06F 11/0793* (2013.01); *G06F 11/076* (2013.01); *G06F 11/0709* (2013.01); *G06N 5/048* (2013.01); *G06N 20/00* (2019.01)

(58) Field of Classification Search
CPC ............. G06F 11/0793; G06F 11/0709; G06F 11/076; G06N 20/00; G06N 5/048
See application file for complete search history.

(56) References Cited

U.S. PATENT DOCUMENTS 9,749,345 B2 *  8/2017  Duer ................... H04L 63/1433
10,217,148 B2 *  2/2019  Abbasi Moghaddam ...................
G06Q 30/0609
(Continued)

FOREIGN PATENT DOCUMENTS

| CN | 104125217 | 10/2014 |
| CN | 103530735 | 8/2016 |
| IN | 2015CH05779 | 7/2017 |

OTHER PUBLICATIONS

Ersue et al., Management of Networks with Constrained Devices: Use Cases, Internet Engineering Task Force (IETF), Request for Comments: 7548, Category: Informational, ISSN: 2070-1721, Jacobs University Bremen May 2015, 26 pages.
(Continued)

*Primary Examiner* — Matthew M Kim
*Assistant Examiner* — Matthew N Putaraksa
(74) *Attorney, Agent, or Firm* — Schmeiser, Olsen & Watts; Maeve M. Carpenter

(57) ABSTRACT

A machine-learning mechanism of a disaster-avoidance system trains a knowledgebase to associate characteristics of a data-center component with corresponding degrees of vulnerability to failure and with remedial steps that may be undertaken to avoid failure or to reduce adverse effects of a failure. This training is performed as a function of inferences derived from historical records and from extrinsic information sources. The historical records identify past failures of similar components, component characteristics associated with past failures, and results of remedial procedures undertaken in response to past failures or to previous occurrences of the characteristics. The extrinsic sources identify the current existence of external conditions known to be associated with past failures. When a component's total degree of vulnerability exceeds a predefined threshold value, the system assembles a subset of that component's remedial (Continued)

steps into a remedial procedure and directs downstream modules or administrators to implement the procedure.

20 Claims, 5 Drawing Sheets

(56) References Cited

U.S. PATENT DOCUMENTS

| | | |
|---|---|---|
| 10,534,918 B1 * | 1/2020 | Davidi ................. G06F 21/577 |
| 2011/0238614 A1 * | 9/2011 | Yoon ...................... G06N 20/00 706/52 |
| 2012/0011590 A1 | 1/2012 | Donovan |
| 2015/0052122 A1 * | 2/2015 | Landry ............... G06F 11/0793 707/723 |
| 2015/0317221 A1 * | 11/2015 | Sampath ................ G06F 11/20 714/4.11 |
| 2017/0134237 A1 | 5/2017 | Yang et al. |
| 2018/0089017 A1 | 3/2018 | Cook et al. |
| 2019/0095820 A1 * | 3/2019 | Pourmohammad .... G06N 20/20 |
| 2020/0133755 A1 * | 4/2020 | Bansal ................ G06F 11/0787 |

OTHER PUBLICATIONS

Imran et al., Challenges in 5G: How to Empower SON with Big Data for Enabling 5G, IEEE Network • Nov./Dec. 2014 0890-8044/14, 7 pages.

* cited by examiner

SELF-LEARNING DISASTER-AVOIDANCE AND RECOVERY

BACKGROUND

The present invention relates in general to information technology (IT) and in particular to preemptive disaster-avoidance and disaster-recovery technologies that predict and attempt to mitigate catastrophic failures before those failures occur.

One goal of disaster-avoidance and recovery technologies is to reduce downtime resulting from the occurrence of a catastrophic event. This goal can be expedited when it is possible to predict which devices and infrastructure components are most likely to fail.

Real-world systems and networks, however, may suffer from enormous numbers of vulnerabilities that vary continuously as devices, network connections, and infrastructure components undergo software and hardware updates, and as network topologies, business practices, component dependencies, and configuration settings evolve during daily operations.

In such cases, known disaster-avoidance and recovery technologies cannot reliably identify vulnerabilities or predict points of failure by merely automating or scaling up human methods of system maintenance.

SUMMARY

Embodiments of the present invention include disaster-avoidance systems, methods, and computer program products for self-learning disaster-avoidance and disaster-recovery. Each component of a data center is associated with a table of conditions that are represented as rules of a knowledgebase. Each condition associates a possible characteristic of a component with a degree of vulnerability to failure that is incurred by the occurrence of the characteristic, and also identifies remedial steps that can be taken to preemptively avoid the occurrence of a failure when the characteristic exists or to mitigate adverse effects of an actual occurrence of such a failure. The knowledgebase is trained by artificially intelligent machine-learning technology that derives inferences from historical logs and current extrinsic data to associate component characteristics with component failures and with remedial procedures. When a component's total degree of vulnerability exceeds a predefined threshold value, the system assembles a subset of the remedial steps associated with the component into a remedial procedure. The system then directs downstream systems or administrators to implement the procedure in order to avoid a failure or mitigate the adverse effects of an unavoidable failure.

DETAILED DESCRIPTION

Figure 1:
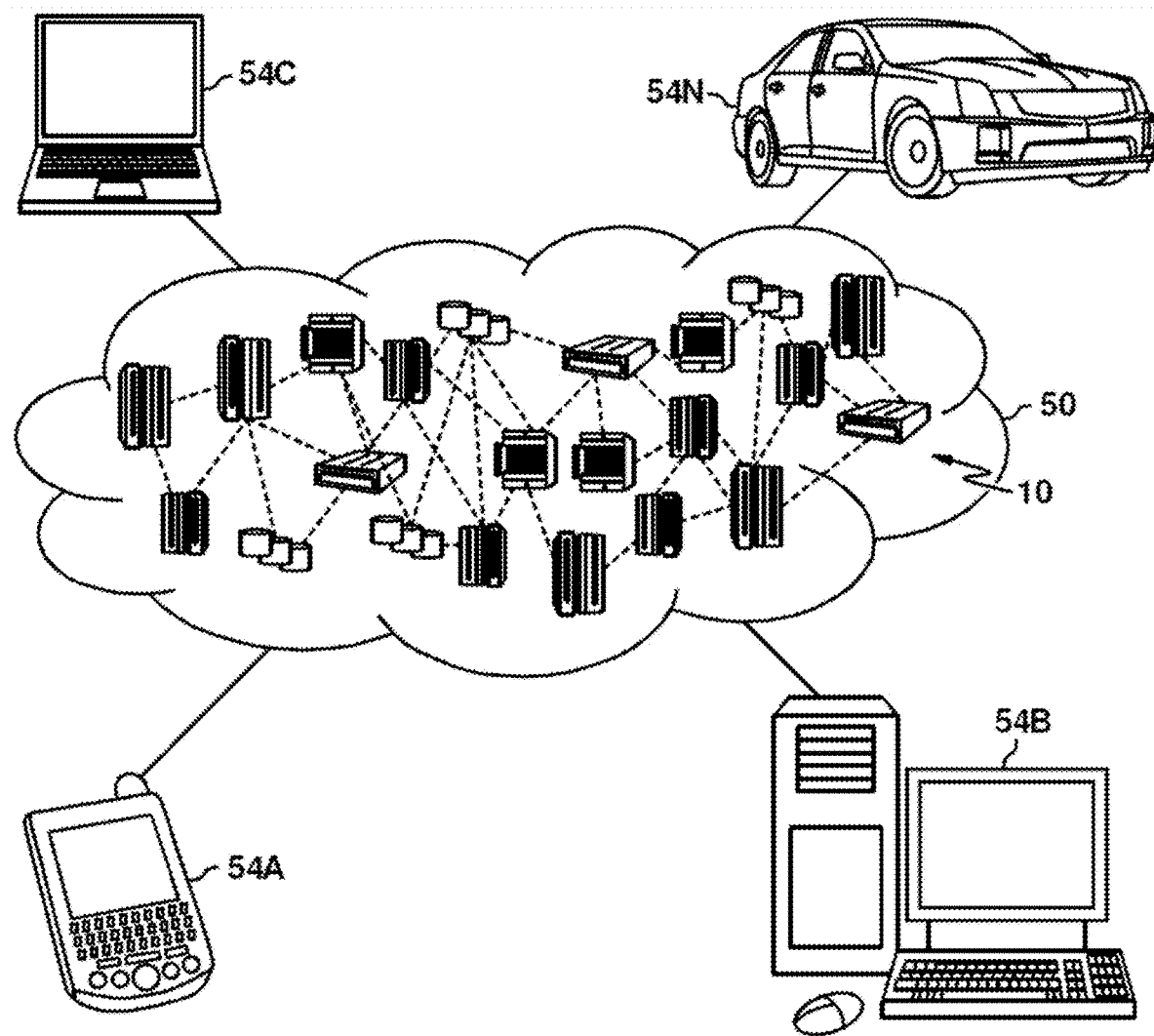
FIG. 1 depicts a cloud computing environment according to an embodiment of the present invention.

One goal of disaster-avoidance and disaster-recovery technologies is to reduce downtime resulting from the occurrence of a catastrophic event. This goal is more feasible when it is possible to predict which devices, applications, and infrastructure components are most vulnerable to imminent failure. Such predictions can help a disaster-avoidance mechanism perform preemptive remedial procedures to prevent a disaster from occurring and, if a disaster does occur, can facilitate efforts to diagnose the cause of the failure and select a recovery plan.

Specific disaster predictions are not generally possible in real-world computing environments, which comprise large numbers of vulnerabilities that vary continuously as devices, network connections, and infrastructure components undergo software and hardware updates, as network topologies, business practices, and configuration settings evolve during the course of daily operations, and as extrinsic factors, such as adverse weather conditions and power outages create new vulnerabilities in real time.

In these and other cases, it may not be possible to reliably identify vulnerabilities or to anticipate points of failure through manual methods of hands-on system administration or by merely upscaling or automating known human methods. It is thus difficult for both human and automated system-maintenance entities to plan for or effectively preallocate money, manpower, and other resources to disaster-mitigation strategies.

Embodiments of the present invention address this problem with practical applications that comprise self-learning systems, methods, and computer program products that improve current disaster-avoidance and disaster-recovery technologies. These self-learning embodiments comprise logical components, including a machine-trainable disaster-avoidance knowledgebase (DKB), a vulnerability-profiling Predictive Profiler 405 application, and a set of component-characteristics tables (CTTs) that intelligently identify and quantize vulnerabilities. These components allow embodiments to predict failures and to automatically assemble and implement self-healing avoidance and recovery procedures.

Unlike conventional, reactive, disaster-recovery strategies that seek to minimize the damage caused by a catastrophic event, embodiments of the present invention comprise predictive mechanisms that reduce or eliminate downtime by preemptively reducing the chance or severity of a catastrophic event. These preemptive procedures are generally targeted to particularly vulnerable components and require less cost, less downtime, and fewer resources than would normally be required to migrate an entire failed environment to a contingency datacenter while specialists isolate, diagnose, and remedy an unexpected failure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops; and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
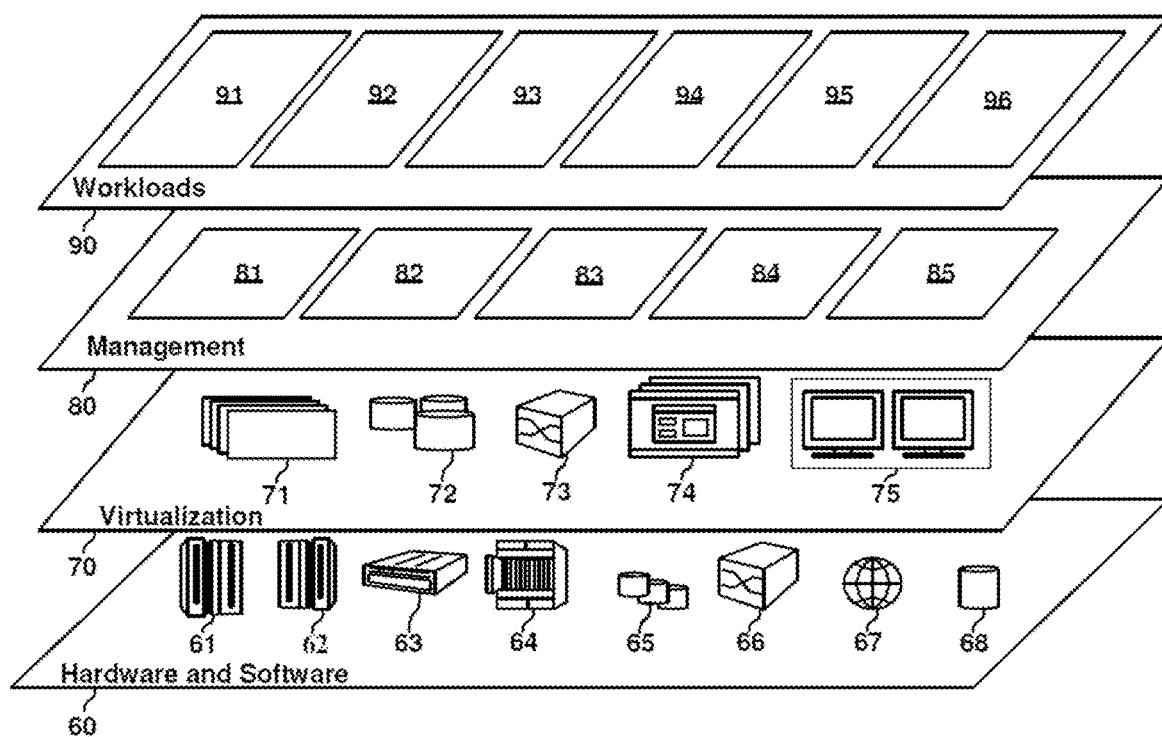
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example; management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex methods and systems for self-learning disaster-avoidance and recovery 96.

Aspects of the present invention may take the form of an entirely hardware embodiment, an entirely software embodiment (including firmware, resident software, microcode, etc.) or embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
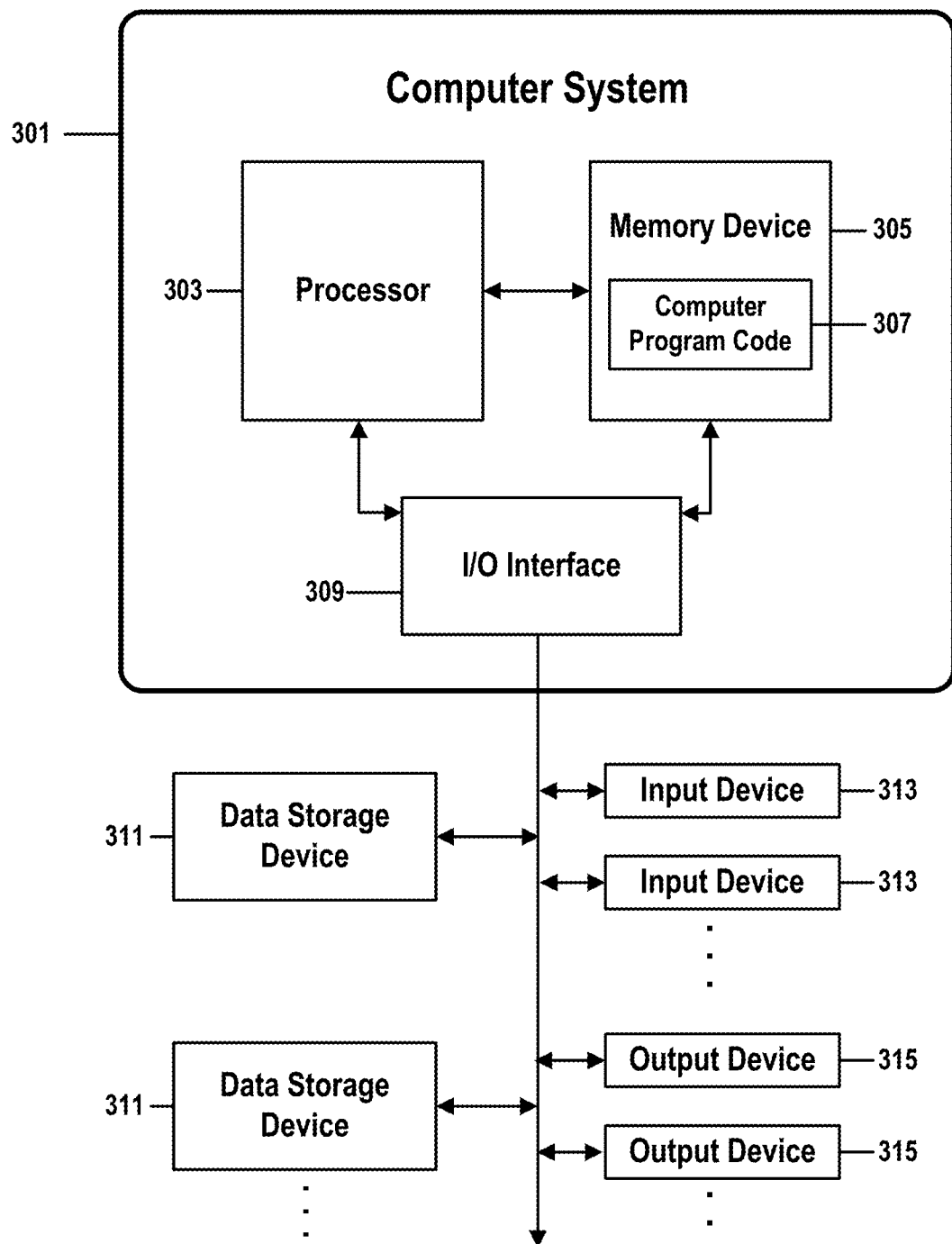
FIG. 3 shows the structure of a computer system and computer program code that may be used to implement a method for self-learning disaster-avoidance and recovery in accordance with embodiments of the present invention.

FIG. 3 shows a structure of a computer system and computer program code that may be used to implement a method for self-learning disaster-avoidance and recovery in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for self-learning disaster-avoidance and recovery in accordance with embodiments of the present invention, and may implement other embodiments described in this specification, including the methods illustrated in FIGS. 1-5A. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for self-learning disaster-avoidance and recovery.

Any of the components of the present invention could be created, integrated, hosted, maintained, deployed, managed, serviced, supported, etc. by a service provider who offers to facilitate a method for self-learning disaster-avoidance and recovery. Thus the present invention discloses a process for deploying or integrating computing infrastructure, comprising integrating computer-readable code into the computer system 301, wherein the code in combination with the computer system 301 is capable of performing a method for self-learning disaster-avoidance and recovery.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for self-learning disaster-avoidance and recovery may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for self-learning disaster-avoidance and recovery is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
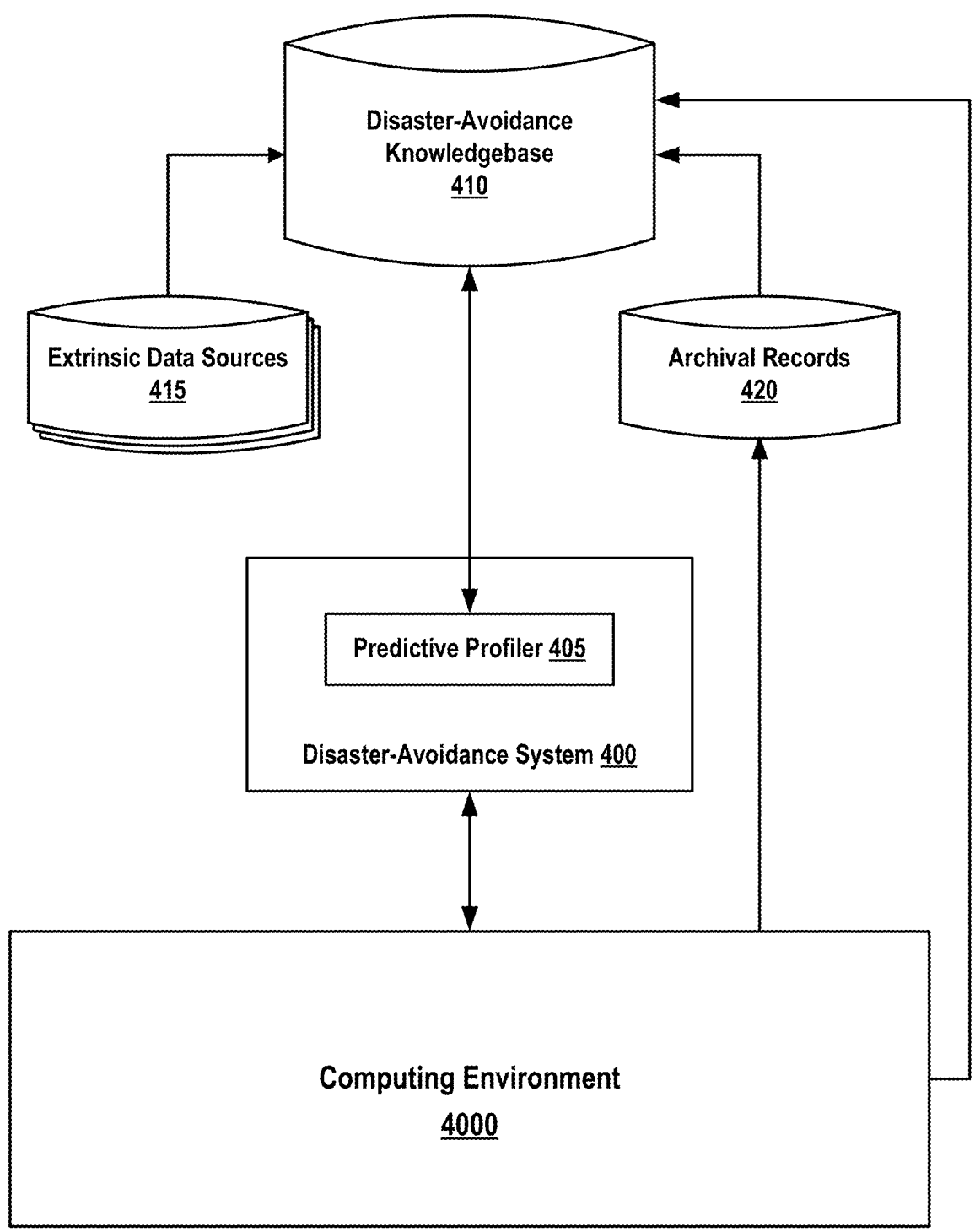
FIG. 4 shows the topology of a system for self-learning disaster-avoidance and recovery in accordance with embodiments of the present invention.

FIG. 4 shows the topology of a system for self-learning disaster-avoidance and recovery in accordance with embodiments of the present invention. FIG. 4 shows items 400-420 and 4000.

Disaster-avoidance system 400 monitors the vulnerabilities of components of computing environment 4000 as those vulnerabilities vary over time. When a predictive profiler module 405 of disaster-avoidance system 400 identifies that a particular set of components of environment 4000 has become unacceptably vulnerable to a catastrophic failure, the predictive profiler 405 initiates a prophylactic action that attempts to avert the disastrous event before the failure occurs. If unable to prevent the failure, profiler module 405 automatically launches a procedure intended to mitigate the downtime and other adverse effects of the failure.

Profiler 405 knows how to select and perform these procedures through machine-learning training procedures that update disaster-avoidance knowledgebase (DKB) 410, DKB 410 associates characteristics of components in environment 4000 with weightings or scores that each identify a relative degree of vulnerability indicated by the current state of a particular characteristic.

DKB 410 is populated and updated by the profiler 405, which retrieves, analyzes, and organizes data retrieved from extrinsic data sources 415, such as weather records and information about past power outages, and from archival records 420 of computing environment 4000. These archival records may include combinations of any recorded data items related to past equipment failures, catastrophic events, or other conditions that resulted in downtime or resource loss. For example, this data can include past component failure or error-condition logs; internal and external conditions associated with a past failure; hardware, software, or network configurations associated with a past failure; backup and data-retention procedures; performance data; component dependencies; system-load or usage patterns; or correlations among these or any other relevant recorded parameters.

The inferential rules and tables comprised by knowledgebase 410 also facilitate inferences that allow the addition of a new component-characteristic table (CCT) to the knowledgebase 410 when a new component is added to computing environment 4000. As described below, each CCT associates characteristics of a component of environment 4000 with that component's degree of vulnerability to failure. Each CCT is an instance of a template table, and each template table describes one class of component. A template or instance can thus be created for a newly added component based on information retrieved from external sources 415 and archival records 420.

If, for example, the retrieved information indicates that the newly added component is similar to a component that is already represented by an existing CCT based on an existing template described in knowledgebase 410, the system can use this information to create a new instance CCT of that same template to characterize the newly added component. Similarly, if the retrieved information indicates that the newly added component shares some characteristics with a component that is already represented by an existing CCT based on an existing template, but is different than the existing component in other ways, the artificially intelligent self-learning system may use this information to create a new template for the new class of component, and to then generate an instance of the new template that characterizes the newly added component.

Knowledgebase 410 may also identify mitigation steps associated with characteristics enumerated by a CCT template, and these steps may be identified as a function of the retrieved data. For example, if a template associated with a storage-device component identifies a characteristic "failure to complete backup," retrieved archival records 420 may indicate that, in the past, system administrators responded to similar failures by: i) updating the backup software; ii) running a hardware diagnostic on the storage device; and iii) attempting to manually retrieve and back up any data that is still accessible from the storage device. The system would then store a mitigation plan in knowledgebase 410 that associates these three steps with the "failure to complete backup" characteristic in each instance of the storage-device template. As described in FIG. 5, if a storage device associated with an instance of this template is determined to have become more vulnerable to failure because of the existence of the backup-failure condition, the system will automatically integrate these steps into a preemptive mitigation procedure intended to prevent such an outage.

The archival records 420 may be stored in a database that is continuously updated in real-time by maintenance and logging functions of components of the computing environment 4000. Similarly, the external data sources 415 comprise live, real-time, continuously updated, or frequently updated data feeds that are updated when an extrinsic condition changes.

If, for example, archival records database 420 receives new information from environment 4000 indicating that a sustained period of sub-zero temperatures has in the past resulted in failure of a particular network infrastructure, profiler 405 would in response "train" knowledgebase 410, through known techniques of machine-learning technology, to establish (or strengthen) a correlation between sustained sub-zero temperatures and an increase in the infrastructure's vulnerability to failure. If a weather forecast captured from an extrinsic weather-feed data source 415 then predicts three days of sub-zero temperatures, profiler 405 would update knowledgebase 410 with the revised weather information. The knowledgebase 410 would then, based on its recent training, identify an increased vulnerability of the infrastructure component to failure, Profiler 405 would respond by initiating an appropriate preemptive action, such as migrating critical data to different network infrastructure before a failure can occur.

These procedures will be described in greater detail in FIG. 5.

Knowledgebase 410 stores or accesses information that may be represented as a set of component-characteristics tables (CTTs) that intelligently identify and quantize vulnerabilities of components and combinations of components of computing environment 4000. For example, if a local-area network (LAN) of environment 4000 contains three servers, twelve user workstations, a storage device, and 16 network interfaces, knowledgebase 410 could contain information from which vulnerabilities of the LAN may be interred.

This document represents each CTT as a linear table for pedagogical reasons, but al-world embodiments of knowledgebase 410 may store this information in any format and structure known in the fields of expert systems, artificial intelligence, or machine-learning. For example, each row of a CTT may be stored as a vector that also includes links or pointers to other vectors or to particular elements of other vectors. The examples and embodiments presented in this document should not be construed to limit the present invention to purely tabular CTTs because the present invention is flexible enough to accommodate any sort of implementation of knowledgebase 410 or the CTTs contained or referenced by knowledgebase 410.

In the current example, characteristics and vulnerabilities of a particular type of LAN server (arbitrarily labeled as a "001"-type server) may be stored as information enumerated in an instance of a SERVER001 component-characteristic table. Table 1 shows a template for such a SERVER001 component-characteristics table. In this example, a server may be categorized as a 001-type server if the server is associated with a certain set of characteristics that an implementer believes related to a degree of vulnerability to outages or other types of failures.

TABLE 1

| | Type 001 Server Characteristic | Status | Vulnerability |
|---|---|---|---|
| 1 | Physical BareMetal | Yes | 1 |
| 2 | Virtual Machine | Yes | 0 |
| 3 | High availability enabled | Yes | 2 |
| 4 | High availability enabled | No | 1 |
| 5 | Backup configured | Yes | 0 |
| 6 | Backup configured | No | 5 |
| 7 | At-risk days | #_of_days | #_of_days |
| 8 | Consecutive failures during daily backups | #_of_days | #_of_days |
| 9 | Consecutive failures during weekly backups | #_of_days | #_of_days |
| 10 | Consecutive failures during monthly backups | #_of_days | #_of_days |
| 11 | Consecutive failures during yearly backups | #_of_days | #_of_days |
| 12 | Current image backup (OS) | Yes | 0 |
| 13 | Current image backup (OS) | No | 1 |
| 14 | DR plan exists | Yes | 0 |
| 15 | DR plan exists | No | 5 |
| 16 | DR with offsite tape | Yes | 0 |
| 17 | DR with offsite tape | No | 1 |
| 18 | DR with Storage replication | Yes | 0 |
| 19 | DR with Storage replication | No | 2 |
| 20 | DR exercises executed periodically | Yes | 0 |
| 21 | DR exercises executed periodically | No | 3 |
| 22 | Local disk (OS) | Yes | 0 |
| 23 | Local disk (OS) | No | 1 |
| 24 | External storage device (OS-boot from SAN) | Yes | 0 |
| 25 | External storage device (OS-boot from SAN) | No | 1 |
| 26 | Monitoring/alerting enabled | Yes | 0 |
| 27 | Monitoring/alerting enabled | No | 1 |
| 28 | Supported/entitled HW config | Yes | 0 |
| 29 | Supported/entitled HW config | No | 1 |
| 30 | Supported/entitled SW config | Yes | 0 |
| 31 | Supported/entitled SW config | No | 1 |
| 32 | DataCenter location | Local | |
| 33 | DataCenter location | cloud | |
| 34 | Weather vuln | High | 2 |
| 35 | Weather vuln | Medium | 1 |
| 36 | Weather vuln | Low | 0 |
| 37 | Regional service outage | High | 2 |
| 38 | Regional service outage | Medium | 1 |
| 39 | Regional service outage | Low | 0 |
| 40 | Third copy of backup data offsite | Yes | 0 |
| 41 | Third copy of backup data offsite | No | 1 |
| 42 | Security Vulnerability | Yes | 3 |
| 43 | Security Vulnerability | No | 0 |

In the Table 1 example of a CCT template, the first column identifies a characteristic or parameter of 001-type servers, the Status column identifies a value of the characteristic, and the Vulnerability column identifies a weight, magnitude, or Vulnerability value that is proportional to a degree of vulnerability that may be incurred by a 001 server if a corresponding characteristic assumes a corresponding value.

For example, Table 1, row 1 specifies that if a 001-type server is a physical bare-metal system, then the server's degree of vulnerability to outages is increased by one unit. Row 2 states that if the server is a virtual machine, the server's degree of vulnerability does not change. Similarly, row 8 specifies that if attempts to perform a daily backup of a 001-type server has repeatedly failed, that server's degree of vulnerability increases by a number of units equal to the number of consecutive days of failures. Rows 14-15 specify that if no disaster-recovery plan exists for the 001-type server described by the table, then that server's degree of vulnerability increases by five units.

Embodiments of the present invention are not limited to the characteristics shown in Table 1. The present invention is flexible enough to accommodate tables that comprise any set of characteristics that an implementer believes are associated with a component's vulnerability to failure. These tables may also comprise any set of characteristics that, as described below and in FIG. 5, are associated with a component's vulnerability to failure by inferences generated by profiler 405, from archival records 420, from extrinsic data sources 415, from information previously stored in knowledgebase 410, or through any other cognitive or inferential means known in the art.

Certain embodiments may initially populate a table template or an instance with characteristics selected by an implementer with expert knowledge of the component or environment 4000 associated with the ter plate or instance, and then continuously revise the template or instance in response to machine-learning training sessions or as a function of inferences automatically generated by profiler 405, from archival records 420, from extrinsic data sources 415, from information previously stored in knowledgebase 410, or through any other cognitive or inferential means known in the art.

A template may be created and stored in knowledgebase 410 for any component or set of components in computing environment 4000. For example, in addition to the template shown in Table 1 for type-001 servers, knowledgebase 410 could, in the current example, store a second template for 002-type servers (where a 001-type server might be a general-purpose application server and a 002-type server might be a network-attached-storage (NAS) server), a third template for network-interface cards, a fourth template for a first type of user workstation, a fifth template for a second type of user workstation, and a sixth template for storage devices.

Embodiments may also create and store in knowledgebase 410 templates and instances of CCTs for combinations of components. Such templates and instances may be especially useful when characterizing components that are associated in dependency relationships. For example, if a first template characterizes vulnerabilities of a first type of storage device and a second template characterizes vulnerabilities of a type of storage-device network interface that provides access to the first type of storage device, a third template could combine contents of the first two in order to characterize vulnerabilities of a storage-device/interface subsystem. Because a dependency between an instance of the storage device and an instance of the network interface increases the device's vulnerability to an outage when the interface suffers an outage, the combined template provides a more robust characterization of the storage device's overall vulnerability.

In this way, the CCTs stored in knowledgebase 410 may be organized into tree structures, where the leaf of each tree is a MI instance that identifies vulnerabilities of a single component of environment 4000 and the root of the highest-level tree is a CCT instance that characterizes vulnerabilities of the entire computing environment 4000.

Table 2 is an instance of a CCT template that comprises vulnerabilities of a particular instance of a type-001 server named S001-01. This example does not include every row of Table 1, since some rows identify mutually exclusive conditions. Instead, Table 2 shows the actual state of each characteristic of server S001-01 and sums the degrees of vulnerability of each characteristic to provide a total vulnerability for server S001-01.

TABLE 2

|    | Component | Characteristic                             | Status | Vulnerability |
|----|-----------|--------------------------------------------|--------|---------------|
| 1  | S001-01   | High availability enabled                  | yes    | 0             |
| 2  | S001-01   | Backup                                     | yes    | 0             |
| 3  | S001-01   | At-risk days                               | 0      | 0             |
| 4  | S001-01   | Consecutive failures for daily backups     | 0      | 0             |
| 5  | S001-01   | Consecutive failures for weekly backups    | 0      | 0             |
| 6  | S001-01   | Consecutive failures for monthly backups   | 0      | 0             |
| 7  | S001-01   | Consecutive failures for yearly backups    | 0      | 0             |
| 8  | S001-01   | Image backup (OS)                          | yes    | 0             |
| 9  | S001-01   | DR implemented                             | yes    | 0             |
| 10 | S001-01   | DR with offsite tape                       | yes    | 0             |
| 11 | S001-01   | DR with Storage replication                | no     | 1             |
| 12 | S001-01   | DR exercises executed periodically         | yes    | 0             |
| 13 | S001-01   | Local disk (OS)                            | yes    | 0             |
| 14 | S001-01   | External storage device (OS-boot from SAN) | no     | 1             |
| 15 | S001-01   | Dual path for SAN access                   | yes    | 0             |
| 16 | S001-01   | Dual path for Network access               | yes    | 0             |
| 17 | S001-01   | Monitoring/alerting enabled                | yes    | 0             |
| 18 | S001-01   | Supported/entitled HW config               | yes    | 0             |
| 19 | S001-01   | Supported/entited SW config                | yes    | 0             |
| 20 | S001-01   | DataCenter location                        | local  | 0             |
| 21 | S001-01   | Weather vuln                               | low    | 0             |
| 22 | S001-01   | Regional service outage                    | low    | 0             |
| 23 | S001-01   | Third copy of backup data offsite          | no     | 1             |
| 24 | Vuln KB   | Vulnerability score for similar environments |      | 2             |
| 25 |           |                                            | TOTAL  | 5             |

In this example, Table 2, row 24 contains an entry "Vulnerability score for similar environments" not shown in the template of Table 1. In some embodiments, profiler 405 may automatically create and add this entry to a CCT template instance for a specific component when the additional vulnerability information may be inferred from existing information stored in knowledgebase 410. For example, if servers of type 001 have been found in the past to fail with regularity when installed in other computer environments, this entry may increase the overall vulnerability score of type-001 servers in the current environment 4000. This step is described in greater detail in FIG. 5.

Table 2, row 25 contains a total vulnerability score that is derived as a function of the vulnerabilities identified in rows 1-24. In the example of Table 2, this total vulnerability of server S001-01 is derived by merely adding the vulnerabilities identified in rows 1-24. Other embodiments may use more complex statistical or other computational methods known in the art, as desired by an implementer, to derive a total vulnerability score in row 25. In the example of Table 2, server S001-01 has a total vulnerability score, or Vulnerability Profile of 5, indicating that server S001-01 is more vulnerable to failure than are any servers (or other components or combinations of components) that have scores less than 5.

Implementers may use any means known in the art to assign scores to characteristics enumerated in a CCT. These scores may be calibrated on any scale desired by an implementer, such as decimal scores capable of varying from 0.0 through 1.0, integer scores that range from 1 through 10, or nonlinear scores calibrated on a logarithmic scale. In all cases, efforts should be made to ensure the relative degrees of vulnerability identified by each score. For example, all characteristic associated with a vulnerability value of 3 should represent a potential vulnerability to failure that is greater than that of a characteristic that associated with a vulnerability of 2.

As FIG. 5 describes in greater detail, Vulnerability Profiles may be aggregated up the hierarchy of CCT instances stored in or referenced by knowledgebase 410. For example, a vulnerability score for a small data center that comprises a network of five servers may be characterized by seven component-characterization tables (CCTs): one table for each server, a sixth table that identifies the data center's potential vulnerability due to the data center's physical location, and a seventh table that identifies vulnerability due to impending weather conditions. These tables may be supplemented by an eighth vulnerability score that is inferred from archival information stored in knowledgebase 410. This eighth score might be computed as a function of the number or frequency of past outages associated with similar data centers and identified by the knowledgebase 410.

The resulting Vulnerability Profile for the entire data center is shown in Table 3.

TABLE 3

| Component | Vulnerability |
|---|---|
| SERVER1 | 5 |
| SERVER2 | 7 |
| SERVER3 | 4 |
| SERVER4 | 4 |
| SERVER5 | 3 |
| Data Center Location | 1 |
| Weather Data | 2 |
| Risk KB | 1 |
| Total | 27 |

In the example of Table 3, vulnerability scores are assigned to the five servers, where each score is derived from the summed score computed in each server's CCT. The data center location score and weather data score are derived from location and weather CCTs or from inferences made by profiler 405 from information received from extrinsic data sources 415 or retrieved from archival records 420.

The data center's total vulnerability score of 27 is then straightforwardly computed as the sum of each component's vulnerability score, the data center's location-related and weather-related vulnerabilities, and additional vulnerabilities inferred from knowledgebase 410's previously trained contents. These scores may all vary continuously as the knowledgebase 410 is continuously updated by profiler 405 in response to continuously updated extrinsic data (such as updated weather forecasts) and continuous updates to the archival record database 420 (such as reports of new failures of servers similar to servers SERVER1-SERVER5 or computing environments that have other characteristics similar to that of the small data center).

Figure 5A:
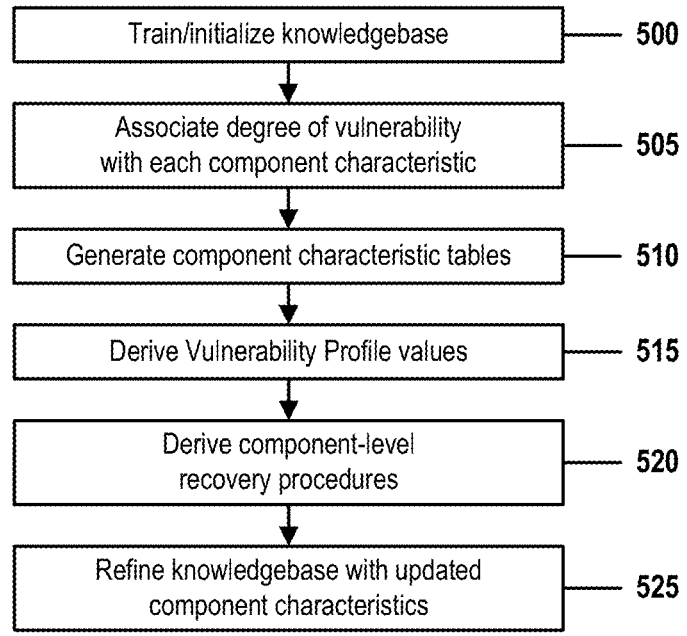
FIG. 5A is a flow chart that shows self-learning and predictive steps of a method for self-learning disaster-avoidance and recovery, in accordance with embodiments of the present invention.

FIG. 5A is a flow chart that illustrates self-learning and predictive steps of a method for self-learning disaster-avoidance and recovery, in accordance with embodiments of the present invention. FIG. 5A shows steps 500-525, which may be performed by embodiments that incorporate the platforms and logical components shown in FIGS. 1-4.

In step 500, knowledgebase 410 undergoes training via machine-learning or other types of cognitive training methods known in the art, such as submitting to knowledgebase 410 a machine-learning corpus from which the knowledgebase 410 may infer characteristics and behaviors of components of computing environment 4000, correlations between certain conditions and a component's degree of vulnerability to failure, and preemptive steps that may be taken to avoid failure when an unacceptable degree of vulnerability exists.

In some embodiments, predictive profiler 405 submits corpora to knowledgebase 410 and performs other machine-learning tasks associated with using machine-learning technology to train a self-learning application. In other embodiments, some or all of these operations can be offloaded to a distinct training module that works in conjunction with other components of a machine-learning function to train knowledgebase 410.

One goal of these operations is to train knowledgebase 410 to intelligently associate a relative degrees of vulnerability to failure which specific characteristics or conditions of components and combinations of components comprised by environment 4000. As described in FIG. 4, knowledgebase 410 contains, or contains links to, component-characteristic tables (CCTs) that each assign a relative degree of vulnerability to characteristics and conditions of these components and combinations. Each CCT is an instance of a template table that enumerates characteristics from which may be inferred a particular class of component's degrees of vulnerability. Each relevant component, or combination of components, of environment 4000 is characterized by an instance, comprised in knowledgebase 410, of one of these templates.

Knowledgebase 410 also contains rules and additional information used by the system to refine each CCT and template and to identify steps capable of preemptively averting a disaster when a particular type of vulnerability rises to an unacceptable level, or capable of mitigating the results of such a disaster if the disaster cannot be avoided.

The training materials from which knowledgebase 410 learns to generate and refine these templates, CCTs, rules, and additional information may include:

Archival records 410 that relate past failures and corrective procedures with particular characteristics, conditions, configurations, or states of specific components. These records may be collected by profiler 405, or by another module of the disaster-avoidance system or of the machine-learning system, from logs and other records generated by any monitoring mechanism known in the art. These records 410 could, for example, comprise system logs, application error logs, audit trails, transaction logs, or reports and repair tickets generated by maintenance and administration personnel. Archival records 410 may also be received from other computing environments that share characteristics with environment 4000 or that comprise components and configurations similar to those comprised by environment 4000.

Extrinsic data sources 415 that allow knowledgebase 410 to associate extrinsic conditions with relative degrees of vulnerability to failure and corrective actions taken to preempt or mitigate the effects of a failure. For example, extrinsic data sources 415 may comprise weather records that can be correlated with archival records 410 in order to infer that the occurrence of a tropical storm increases the vulnerability of a particular type of data center to site-wide power outages.

Extrinsic sources 415 may also include industry standards, conventions, product literature, and third-party reference materials. For example, if a vendor publishes a mean-time-between-failures (MTBF) specification for a particular model computer, knowledgebase 410 could infer from this information a relative vulnerability of a server based on that model. In a more nuanced example, if the vendor publishes MTBF figures for the model at different operating temperatures, a CCT template for that model may comprise multiple characteristics that each identify a degree of vulnerability at a different ambient temperature.

At the conclusion of step 500, knowledgebase 410 will contain an initial set of CCT templates that each associate a set of vulnerability-related characteristics and corresponding preemptive or corrective procedures with a type of component or combination of components of environment 4000. These templates are described in greater detail in FIG. 4 and Table 1.

In step 505, profiler 405, in conjunction with knowledgebase 410, associates a degree of vulnerability with each CCT characteristic identified in step 500. These associations may be made by any means known in the art, such as by means of inferential methods of cognitive computing or by means of a machine-learning mechanism by which the knowledgebase 410 learns to estimate relative vulnerabilities based on past events. For example, a CCT of a particular class of server may contain a "25% average CPU utilization" characteristic and a "50% average CPU utilization" characteristic. If archival records 420 indicate that servers averaging 50% utilization have in the past had double the failure rate of servers averaging 25% utilization, then in this step, the "25% average CPU utilization" characteristic could be assigned a degree of vulnerability equal to 2 and the "50% average CPU utilization" characteristic would be assigned a degree of vulnerability equal to 4.

As described in FIG. 4, any sort of scale may be used to specify relative degrees of vulnerability, as desired by an implementer. For example, the above "25% average CPU utilization" characteristic could, if desired by an implementer, have been associated with a vulnerability of 0 and the "50% average CPU utilization" characteristic associated with a vulnerability of 1. In all cases, a higher degree of vulnerability must indicate that a characteristic has been demonstrated in the past to have a greater degree of correlation with failures or outages.

If desired by an implementer, degrees of vulnerability comprised by a CCT template, or by an instance of a template, may be further weighted as a function of the criticality of a particular component or of a particular class of component. For example, if a critical server is based on the same hardware as a noncritical public workstation, and both devices are known to have identical failure rates, vulnerabilities identified in the critical server's CCT template or instance may be more heavily weighted than those of the noncritical workstation. This weighting difference can indicate the greater impact, or more extensive ripple effects, of a critical-component failure. Furthermore, if the overall vulnerabilities of both the critical and noncritical components are elements of a data center's overall vulnerability, the difference in weighting would better represent the fact that the entire data center is more vulnerable to an outage if the critical server fails than it would be if a mere workstation fails.

It is not essential that these degrees of vulnerability be initially estimated with great precision. As new information becomes available over time from extrinsic data sources 415 and archival records 420, profiler 405 will continue to fine-tune the knowledgebase CCTs through additional training. Even if the initial degrees of vulnerability selected in step 505 do not provide sufficient predictive value, the system's self-learning nature will ensure that the system over time learns to more accurately predict failures and outages and to identify effective steps to take when a failure is determined to be imminent.

In step 510, profiler 405 retrieves listings of the components to be monitored by the system. These listings may be retrieved by any means known in the art, including extracting the lists from sources similar to those that provide archival records 420, using knowledgebase rules to select components that fall into component classes that have in the past been most often tracked or that have in the past been associated with characteristics that correlate in significant ways with relevant degrees of vulnerability to failure.

In some cases, the system may not have access to a complete set of data required for a specific component or for a specific template. In such cases, the cognitive aspects of the system, relying on knowledgebase rules inferred from previously retrieved data and on similarities among existing CCT templates and instances, may attempt to guess at the missing data. For example, if a new storage device offers a capacity that is an order of magnitude greater than any storage device currently installed in environment 4000, there may be no CCT template for such a device in the knowledgebase 410. In such a case, the system might derive a new CCT template for that new device from a template that is the closest match for the device. Although some characteristics of the previous template may not apply to the new device, the new template would be similar enough to provide a starting point for a template that is more specific to the new device. As with other CCT templates in knowledgebase 410, this new template would be iteratively refined over time in step 525, based on real-world feedback. Because of the system's self-learning capabilities, the system will eventually learn how to properly characterize the new device and how to accurately associate vulnerabilities to each characteristic.

At the conclusion of step 510, the system will have created an instance of a component-characteristics table for each component, or combination of components, of environment 4000 that an implementer wishes to track. In some embodiments, the system may have created an instance of a component-characteristics table for each component, or combination of components, of environment 4000 that the system recognizes as being relevant contributors to a data center's vulnerability to outages. When making such as recognition, the system would rely on experience gained through ongoing machine-learning training sessions based on extrinsic and archival information 415-420. This experience allows the system to continuously learn how to identify which components and conditions are capable of contributing to a data center's vulnerability to outages.

Each CCT instance will have been tailored to match the actual configuration or condition of the component, or combination of components, associated with the instance. This may be done in a manner described in FIG. 4 and shown in Tables 1 and 2. For example, if a CCT template for print-server components contains two entries "Available ports" and "No available ports," each instance of this template that is associated with a specific, real-world print server running in computing environment 4000 would contain only one of the two entries, depending on the server's number of available ports.

In step 515, profiler 405 or another module of the self-learning disaster-avoidance system derives a vulnerability-profile value of each CCT instance populated in step 515. Each value may be derived by merely summing the degrees of vulnerability enumerated in the table instance, or may be derived by more involved computational procedures, as desired by an implementer. This procedure is discussed in greater detail in FIG. 4 and illustrated by Tables 2 and 3.

This procedure may be performed in a hierarchical manner. For example, if knowledgebase 410 comprises a CCT instance for each of six servers hosted by a particular LAN, a CCT instance for the network infrastructure of the LAN, and twelve CCT instances for user devices attached to the LAN infrastructure, these nineteen CCTs will each be associated with a corresponding Vulnerability Profile value that specifies a corresponding component's relative degree of vulnerability to failure. If the knowledgebase 410 also contains a CCT instance that specifies the relative degree of vulnerability of the entire LAN, that LAN instance may enumerate the nineteen server, infrastructure, and user-device Vulnerability Profile values. In this example, the Vulnerability Profile value of the LAN instance would be derived as the sum of the nineteen component values.

A single Vulnerability Profile value of an entire data center or other computing environment 4000 may be derived in this manner. By summing Vulnerability Profile values of various components of environment 4000 into Vulnerability Profile values of combinations of components in a hierarchical manner, a top-level Vulnerability Profile value that comprises vulnerability values of the entire environment 4000 may be represented as a single number.

In step 520, profiler 405 identifies steps that may be taken to avoid or mitigate the effects of failures associated with each characteristic or vulnerability identified by a CCT instance in the knowledgebase 410. For example, if a RAID-storage CCT template identifies a characteristic "bad sectors identified," profiler 405 may identify steps that should be taken when this characteristic is identified as being present in any instance of the RAID-storage CCT. Such steps might include running diagnostics or replacing a failing disk.

These steps may be selected as part of a procedure to be performed after a failure as occurred, in order to mitigate the adverse effects of the failure. In other cases, these steps may be selected as part of a procedure to be performed when the condition is detected, so as to prevent a failure from occurring.

In some cases, these steps may be invoked only when several conditions occur contemporaneously. For example, rather than performing preemptive steps simply because bad sectors have been identified at some location in the RAID array, a knowledgebase rule may require steps to be performed only when bad sectors are identified on more than one disk of the array.

In yet other cases, a knowledgebase rule may require steps to be taken when a total Vulnerability Profile value of a component exceeds a predefined threshold value. In initial value of this threshold may be chosen at will by an implementer and later iteratively refined through continuing machine-learning procedures as the self-learning disaster-avoidance system continues to retrieve and process records from extrinsic sources 415 and archival records 420.

In some embodiments, these recovery rules and steps are stored in knowledgebase 410. In other embodiments, they may be stored in any other repository accessible to the self-learning disaster-avoidance system, or represented in any manner known in the art of artificially intelligent, cognitive, or self-learning application software.

In step 520, profiler 405 continues to perform previous steps of the method of FIG. 5A, in response to continuing receipt of updated information from extrinsic data sources 415 and archival records 420. For example, if weather conditions are considered to be factors affecting an environment 4000's vulnerability to outages, profiler 405 would continue to update CCT templates and instances that enumerate degrees of vulnerability as functions of specific weather events. In such a case, if new reports of power outages due to snow accumulations greater than six inches are retrieved as archival records 420, profiler 405 might increase the degrees of vulnerability of snow-related characteristics listed in certain CCT templates and instances. This revision would reflect the increased likelihood of an outage should a major snowstorm occur. Similarly, if updated data received from an extrinsic source 415 suggests that a major snowstorm is imminent, CCT instances based on templates that comprise snow-related characteristics would be revised to add those characteristics.

This revision procedure is performed indefinitely, ensuring that the system continues to learn from continually updated extrinsic sources 415 and archival records 420. Over e, the knowledgebase 410, and the CCT templates, CCT instances, mitigating or preemptive steps, and rules become more closely rooted in real-world conditions, occurrences, and behaviors. The system thus eventually learns to accurately identify the existence of an unacceptable degree of vulnerability to failure. And when such an unacceptable degree is identified, the hierarchical nature of the component-characteristic tables stored in knowledgebase 410 allows the system to quickly identify the particular components, and the particular characteristics of those components, that are contributing to the data center's vulnerability.

This procedure continues until either: an outage, failure, or other proscribed event occurs; or ii) a Vulnerability Profile exceeds a predefined threshold value. In either case, the system initiates the remedial mitigating or recovery procedure of FIG. 5B.

At the conclusion of the method of FIG. 5A, profiler 405 (or other modules of the preemptive disaster-avoidance system) will have populated knowledgebase 410 with a set of component-characteristic templates that each identify:

i) a set of possible characteristics of a particular class of components comprised by a computing environment 4000, for a combination of such components, or for an extrinsic factor like a weather condition;

ii) a relative degree of vulnerability to failure or outage that is associated with each characteristic, and that represents an increase in such vulnerability associated with the existence of a characteristic; and iii) an optional set of steps that may be taken when a relative degree of vulnerability of a component or components, or a sum of such degrees of vulnerability, exceed a predetermined threshold value.

Knowledgebase 410 also contains, or identifies locations of, component-characteristic tables (CCTs) each derived as an instance of one template. Each instance characterized the state of an actual component or combination of components comprised by environment 4000. Because some template characteristics are mutually exclusive, each CCT instance contains a subset of the characteristics enumerated in the corresponding template.

Knowledgebase 410 also contains a set of rules that allow the cognitive predictive profiler 405 of disaster-avoidance system 400 to create, update, and otherwise manage the CCT templates and instances. For example:
- when a component is removed from environment 4000, profiler 405 deletes that component's table instance from the knowledgebase 410;
- when a component is added to environment 4000, profiler 405 selects an appropriate template, creates an instance of the template for that component, and populates the instance with characteristics relevant to the component;
- if no template is an exact match for the component class of a newly added component, profiler 405 intelligently determines which template identifies a set of characteristics most similar to characteristics of the new component and creates a new template and instance for that component; and
- when inter-component dependencies, network topologies, or component hierarchies suggest that a vulnerability of a particular component of combination of components is a function of vulnerabilities of other components, profiler 405 creates a new template for the higher-level particular component or combination that aggregates, sums, or otherwise combines vulnerabilities of the other components.

Profiler 405 is a self-learning system that is continuously trained by methods of machine-learning to perform these and similar tasks related to maintaining knowledgebase 410. As new information arrives from extrinsic data sources 415 and from archival records 420, profiler 405 uses methods of artificial intelligence to infer semantic meaning from the arriving information, from which profiler 405 gains further experience in determining: which characteristics of a component are relevant to that component's vulnerability to failure; the relative degree of vulnerability incurred by the existence of a particular characteristic or condition; which components are composed of combinations of other components or are in dependency relationships with other components; minimum threshold Vulnerability Profile values for characteristics, components, or combinations of components capable of initiating the recovery procedure of FIG. 5A; which steps are most effective in preemptively avoiding a failure associated with the existence of a certain characteristic or combination of characteristics; which steps are most effective in mitigating the adverse effects of a failure that cannot be avoided; which extrinsic factors increase a component's vulnerability to failure; and how to weight each degree of vulnerability associated with the existence of a characteristic or condition so as to most accurately predict when to take steps to avoid or mitigate the effects of an outage or failure.

As profiler 405 continues to learn to more accurately perform these operations, profiler 405 continuously updates knowledgebase 410's templates, instances, and rules to better represent the profiler 405's improved understanding. This creates a cognitive, self-learning disaster-avoidance system 400 that becomes increasingly effective over time in its efforts to eliminate or mitigate outages and other failures in computing environment 4000.

Figure 5B:
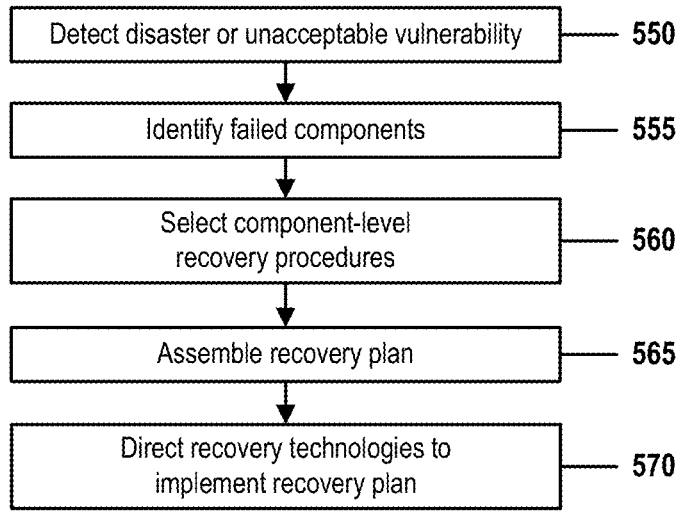
FIG. 5B is a flow chart that shows automated recovery procedures initiated by a self-learning disaster-avoidance and recovery system, in accordance with embodiments of the present invention.

FIG. 5B is a flow chart that shows automated recovery procedures initiated by a self-learning disaster-avoidance and recovery system, in accordance with embodiments of the present invention. FIG. 5B shows steps 550-570, which may be performed by embodiments that incorporate the platforms and logical components shown in FIGS. 1-4.

In step 550, disaster-avoidance system 400 or a predictive profiler module 405 of system 400 detects that either: i) a failure or outage of a component or components tracked by a CCT of knowledgebase 410 has occurred; or ii) a Vulnerability Profile of a CCT instance in knowledgebase 410 has exceeded a predefined threshold value, indicating a component or components of environment 4000 has incurred an unacceptable degree of vulnerability to failure.

In step 555, profiler 405 responds to the detection of step 550 by identifying which components or component characteristics have failed or have generated the unacceptable level of vulnerability. This step may be performed through conventional means, such as by detecting that a variable related to a Vulnerability Profile value has exceeded a certain magnitude, by cognitive means in which profiler 405 intelligently recognizes (based on past training of profiler 405 and on rules and other information stored in knowledgebase 410) which component or components have failed or have triggered the vulnerability detection, or through other means known in the art.

In step 560, profiler 405 retrieves recovery steps associated with each characteristic or component identified in step 560. These steps may either identify a procedure for preemptively averting an imminent failure or outage identified by the high degree of vulnerability detected in step 550, or may identify a procedure for mitigating the adverse effects of an existing outage. As mentioned above, these steps may have previously been stored in, or associated with, one or more component-characteristic table (CCT) templates or instances.

Profiler 405 then, using rules and procedures identified in knowledgebase 410, assembles the retrieved recovery steps into an overall procedure capable of addressing the failure or vulnerability detected in step 550. In one example, profiler 405 in step 500 detects an unacceptable Vulnerability Profile value for a workstation, where the unacceptable value is the sum of degrees of vulnerability associated with four characteristics of the workstation. Each of these characteristics identifies three recovery steps intended to address a corresponding characteristic. In this case, profiler 405, using rules and inferences stored in knowledgebase 410, intelligently assembles and condenses those four three-step procedures into a ten-step procedure capable of correcting the undesirable conditions and preventing the at-risk workstation from failing.

In step 570, disaster-avoidance system 400 directs various recovery technologies to implement the recovery plan assembled in step 565. These technologies may include automated diagnostic systems, resiliency systems capable of backing up, copying, or moving at-risk data, and alert systems configured to report conditions to downstream human or automated administration and maintenance entities.

At the conclusion of the method of FIG. 5B, disaster-avoidance system records details of the condition detected in step 550, the causes of the condition identified in step 555, the recovery procedure assembled in step 565, and the result of the implementation of the recovery procedure. These details will then be used to further train the profiler 405 and update the knowledgebase 410 during the next iteration of step 525.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A disaster-avoidance system comprising a processor, a memory coupled to the processor, and a computer-readable hardware storage device coupled to the processor, the storage device containing program code configured to be run by the processor via the memory to implement a method for self-learning disaster-avoidance and recovery, the method comprising:
    associating a first component of a data center with a first table of conditions,
        where a first condition of the first table identifies a first possible characteristic, a first degree of vulnerability, and a first set of remedial steps,
        where the first degree of vulnerability specifies a degree of vulnerability to failure of the first component,
        where the first degree of vulnerability is incurred when the first component exhibits the first characteristic, and
        where the first set of remedial steps specifies an operation intended to mitigate the first degree of vulnerability;
    determining that a sum of all degrees of vulnerability identified by the first table exceeds a predetermined vulnerability threshold of the first component,
        where exceeding the predetermined vulnerability threshold indicates that a remedial procedure must be performed to address a possible failure of the first component;
    responding to the determining by inserting into the remedial procedure a subset of all remedial steps identified by conditions of the first table of conditions; and
    directing downstream components to perform the remedial procedure.

2. The system of claim 1, where the remedial procedure is intended to preemptively avoid an occurrence of the possible failure.

3. The system of claim 1, where the remedial procedure is intended to mitigate an adverse effect of an occurrence of the possible failure.

4. The system of claim 1,
    where the first condition is defined by an artificially intelligent machine-learning component of the system that infers:
        an association between an occurrence of the first characteristic and the first degree of vulnerability, and
        an indication that the first set of remedial steps is capable of reducing the first degree of vulnerability.

5. The system of claim 4,
    where the inferences are inferred from received sets of information that identify:
        an association linking a past occurrence of the first condition with a past failure of a component that is in a same category as the first component, and
        a result of performing the first set of remedial steps in response to the past failure.

6. The system of claim 5, further comprising:
    a knowledgebase that comprises rules representing conditions comprised by the first table,
        where the knowledgebase rules are refined by the machine-learning component in response to receiving each set of the received information, and
        where the system learns from the knowledgebase refinements how to more accurately avoid failures of the first component and how to more effectively mitigate adverse effects of an actual failure of the first component.

7. The system of claim 6, further comprising:
    detecting a previously undetected component that is in the same category as the first component;
    responding to the detecting by defining a copy of the first table that contains values of conditions that characterize a current state of the previously undetected component; and
    adding rules to the knowledgebase representing the copy of the first table.

8. The system of claim 6, further comprising:
    detecting a previously undetected component that is in a category distinct from any category of any component associated with a rule of the knowledgebase;
    responding to the detecting by determining that the first table comprises a greater number of characteristics germane to the previously undetected component than does any other table represented by rules of the knowledgebase;
    defining a partial copy of the first table that contains values of the germane conditions that characterize a current state of the previously undetected component; and
    adding rules to the knowledgebase representing the partial copy of the first table.

9. The system of claim 5, where the received sets of information comprise:
    historical records that identify: previous component failures, characteristics of previously failing components, and results of remedial processes undertaken to address the previous component failures.

10. The system of claim 5, where the received sets of information comprise:
    current information received from extrinsic sources from which may be inferred an occurrence, or a likelihood of an occurrence, of an extrinsic condition comprised by the first table of conditions,
        where a characteristic identified by the extrinsic condition is an environmental characteristic that is extrinsic to the first component and that is associated with an extrinsic degree of vulnerability to failure of the first component.

11. A method for self-learning disaster-avoidance and recovery, the method comprising:
    a disaster-avoidance system associating a first component of a data center with a first table of conditions,
        where a first condition of the first table identifies a first possible characteristic, a first degree of vulnerability, and a first set of remedial steps, where the first degree of vulnerability specifies a degree of vulnerability to failure of the first component,
where the first degree of vulnerability is incurred when the first component exhibits the first characteristic, and
where the first set of remedial steps specifies an operation intended to mitigate the first degree of vulnerability;
the system determining that a sum of all degrees of vulnerability identified by the first table exceeds a predetermined vulnerability threshold of the first component,
where exceeding the predetermined vulnerability threshold indicates that a remedial procedure must be performed to address a possible failure of the first component;
the system responding to the determining by inserting into the remedial procedure a subset of all remedial steps identified by conditions of the first table of conditions; and
the system directing downstream components to perform the remedial procedure.

12. The method of claim 11,
where the first condition is defined by an artificially intelligent machine-learning component of the system that infers:
an association between an occurrence of the first characteristic and the first degree of vulnerability, and
an indication that the first set of remedial steps is capable of reducing the first degree of vulnerability,
where the inferences are inferred from received sets of information that identify:
an association linking a past occurrence of the first condition with a past failure of a component that is in a same category as the first component, and
a result of performing the first set of remedial steps in response to the past failure.

13. The method of claim 12, further comprising:
a knowledgebase that comprises rules representing conditions comprised by the first table,
where the knowledgebase rules are refined by the machine-learning component in response to receiving each set of the received information, and
where the system learns from the knowledgebase refinements how to more accurately avoid failures of the first component and how to more effectively mitigate adverse effects of an actual failure of the first component.

14. The method of claim 13, where the received sets of information comprise:
historical records that identify: previous component failures, characteristics of previously failing components, and results of remedial processes undertaken to address the previous component failures.

15. The method of claim 13, where the received sets of information comprise:
current information received from extrinsic sources from which may be inferred an occurrence, or a likelihood of an occurrence, of an extrinsic condition comprised by the first table of conditions,
where a characteristic identified by the extrinsic condition is an environmental characteristic that is extrinsic to the first component and that is associated with an extrinsic degree of vulnerability to failure of the first component.

16. The method of claim 11, further comprising providing at least one support service for at least one of creating, integrating, hosting, maintaining, and deploying computer-readable program code in the computer system, wherein the computer-readable program code in combination with the computer system is configured to implement the associating, the determining, the responding, and the directing.

17. A computer program product, comprising a first computer-readable storage medium having a computer-readable program code stored therein, the program code configured to be executed by a disaster-avoidance system comprising a processor, a memory coupled to the processor, and a second computer-readable storage medium coupled to the processor, the storage medium containing program code configured to be run by the processor via the memory to implement a method for self-learning disaster-avoidance and recovery, the method comprising:
the disaster-avoidance system associating a first component of a data center with a first table of conditions,
where a first condition of the first table identifies a first possible characteristic, a first degree of vulnerability, and a first set of remedial steps,
where the first degree of vulnerability specifies a degree of vulnerability to failure of the first component,
where the first degree of vulnerability is incurred when the first component exhibits the first characteristic, and
where the first set of remedial steps specifies an operation intended to mitigate the first degree of vulnerability;
the system determining that a sum of all degrees of vulnerability identified by the first table exceeds a predetermined vulnerability threshold of the first component,
where exceeding the predetermined vulnerability threshold indicates that a remedial procedure must be performed to address a possible failure of the first component;
the system responding to the determining by inserting into the remedial procedure a subset of all remedial steps identified by conditions of the first table of conditions; and
the system directing downstream components to perform the remedial procedure.

18. The computer program product of claim 17,
where the first condition is defined by an artificially intelligent machine-learning component of the system that infers:
an association between an occurrence of the first characteristic and the first degree of vulnerability, and
an indication that the first set of remedial steps is capable of reducing the first degree of vulnerability,
where the inferences are inferred from received sets of information that identify:
an association linking a past occurrence of the first condition with a past failure of a component that is in a same category as the first component, and
a result of performing the first set of remedial steps in response to the past failure.

19. The computer program product of claim 18, further comprising:
a knowledgebase that comprises rules representing conditions comprised by the first table,
where the knowledgebase rules are refined by the machine-learning component in response to receiving each set of the received information, and
where the system learns from the knowledgebase refinements how to more accurately avoid failures of the first component and how to more effectively mitigate adverse effects of an actual failure of the first component.

20. The computer program product of claim 18, where the received sets of information comprise:
historical records that identify: previous component failures, characteristics of previously failing components, and results of remedial processes undertaken to address the previous component failures; and
current information received from extrinsic sources from which may be inferred an occurrence, or a likelihood of an occurrence, of an extrinsic condition comprised by the first table of conditions,
where a characteristic identified by the extrinsic condition is an environmental characteristic that is extrinsic to the first component and that is associated with an extrinsic degree of vulnerability to failure of the first component.

* * * * *